United States Patent
Furman et al.

(10) Patent No.: US 12,041,010 B2
(45) Date of Patent: Jul. 16, 2024

(54) SYSTEMS AND METHODS FOR SUPPORTING NEAR-REAL TIME PROPAGATION PREDICTION AND FREQUENCY MANAGEMENT

(71) Applicant: Harris Global Communications, Inc., Rochester, NY (US)

(72) Inventors: William N. Furman, Fairport, NY (US); Richard J. Buckley, Chandler, AZ (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 414 days.

(21) Appl. No.: 17/523,871

(22) Filed: Nov. 10, 2021

(65) Prior Publication Data

US 2023/0141890 A1    May 11, 2023

(51) Int. Cl.
| | |
|---|---|
| H04B 17/373 | (2015.01) |
| H04B 17/382 | (2015.01) |
| H04L 5/00 | (2006.01) |
| H04W 72/0453 | (2023.01) |
| H04W 72/54 | (2023.01) |
| G06N 20/00 | (2019.01) |

(52) U.S. Cl.
CPC ......... *H04L 5/0073* (2013.01); *H04B 17/373* (2015.01); *H04B 17/382* (2015.01); *H04W 72/0453* (2013.01); *H04W 72/54* (2023.01); *G06N 20/00* (2019.01)

(58) Field of Classification Search
None
See application file for complete search history.

(56) References Cited

U.S. PATENT DOCUMENTS

| | | |
|---|---|---|
| 5,943,629 A | 8/1999 | Ballard et al. |
| 9,930,558 B2 | 3/2018 | Sahin et al. |
| 9,978,013 B2 | 5/2018 | Kaufhold |

(Continued)

FOREIGN PATENT DOCUMENTS

| | | | |
|---|---|---|---|
| CN | 103945533 B | 8/2016 | |
| CN | 111434049 B | 6/2021 | |
| WO | WO-2011040041 A1 * | 4/2011 | ............. H04L 5/001 |

OTHER PUBLICATIONS

"Staring Link Establishment for High-Frequency Radio", Johnson, 2015 (Year: 2015).*

(Continued)

*Primary Examiner* — Jay L Vogel
(74) *Attorney, Agent, or Firm* — Fox Rothschild LLP; Carol Thorstad-Forsyth

(57) ABSTRACT

Systems and methods for operating a system. The methods may comprise: using a machine learning model to identify which frequency of a plurality of possible frequencies that can be used by a communication device for wireless communications is an inferred best frequency based on weather report information and/or predicted weather information; performing operations to select a best frequency from the plurality of possible frequencies using the inferred best frequency and a frequency value selected by a link establishment process of the communication device; and causing the communication device to communicate signals with the best frequency which was selected.

14 Claims, 7 Drawing Sheets

(56) References Cited

U.S. PATENT DOCUMENTS

| | | | |
|---|---|---|---|
| 10,122,479 B2 | 11/2018 | Dzierwa | |
| 10,375,585 B2 | 8/2019 | Tan et al. | |
| 10,408,913 B2 | 9/2019 | Miller | |
| 10,643,153 B2 | 5/2020 | O'Shea | |
| 10,944,436 B1 | 3/2021 | Buckley | |
| 11,003,988 B2 | 5/2021 | Hsieh et al. | |
| 11,076,308 B2 | 7/2021 | Kleinbeck et al. | |
| 2005/0107041 A1* | 5/2005 | Eder | H04W 88/06 455/403 |
| 2008/0063028 A1* | 3/2008 | Lekkas | H04B 1/04 375/130 |
| 2010/0173586 A1* | 7/2010 | McHenry | H04W 16/14 455/62 |
| 2015/0296516 A1* | 10/2015 | Jung | H04W 16/14 370/312 |
| 2015/0324690 A1 | 11/2015 | Chilimbi et al. | |
| 2019/0200244 A1* | 6/2019 | Polepalli | G06N 20/00 |
| 2019/0319868 A1 | 10/2019 | Svennebring et al. | |
| 2021/0006949 A1 | 1/2021 | Amini et al. | |
| 2023/0025432 A1* | 1/2023 | Da Silva | H04W 36/36 |

OTHER PUBLICATIONS

Extended European Search Report for European Patent Application No. 22204615, dated Feb. 9, 2023 (10 pages).

Li et al., "Forecasting Ionospheric foF2 Based on Deep Learning Method," Remote Sensing, 13(19), 20 pages (2021).

Liu et al., "Forecasting Global Ionospheric TEC Using Deep Learning Approach," Space Weather, 18(11), 12 pages (2020).

Melian-Gutierrez et al., "Hybrid UCB-HMM: A Machine Learning Strategy for Cognitive Radio in HF Band," IEEE Transactions on Cognitive Communications And Networking, 1(3), pp. 347-358 (2015).

Wang et al. "Regional Refined Long-Term Predictions Method of Usable Frequency for HF Communication Based on Machine Learning Over Asia," IEEE Transactions on Antennas and Propagation, 70(6), pp. 4040-4055 (2021).

\* cited by examiner

SYSTEMS AND METHODS FOR SUPPORTING NEAR-REAL TIME PROPAGATION PREDICTION AND FREQUENCY MANAGEMENT

BACKGROUND

Statement of the Technical Field

The present document concerns communication systems. More specifically, the present document concerns systems and methods for supporting near-real time propagation prediction and frequency management.

Description of the Related Art

Communication devices are well known. One such communication device is a High Frequency (HF) radio. The HF band (e.g., 3-30 MHz) has been used to provide connectivity between communication devices without the use of relays or other intermediate equipment. In the HF radio, propagation between radios are dependent on the following factors: time of day, time of year, year of the 11-year solar cycle, local noise and interference, Earth's geomagnetic activity, and/or solar weather. Carrier frequency selection needs to take these factors into consideration. Successful operations of the HF radio presently requires one or more of the following: an expert user that has in depth knowledge of the listed factors and which carrier frequency to use at any given time based on the listed factors; an assistant in the form of an Automatic Link Establishment (ALE) that has recent link information and facilitated communication link establishment between HF radios; and/or pre-mission planning using a propagation prediction program (e.g., Voice of America Coverage Analysis Program (VOACAP)). VOACAP generally involves periodically (e.g., hourly) generating Signal-to-Noise Ratio (SNR) predictions at a radio receiver based on long term monthly median data. These SNR predictions do not attempt to model day-to-day effects and are often made outside of the HF radios as part of overall system frequency planning. One can alternatively or additionally analyze measured SNR data from a variety of possible sources, with day-to-variances that can provide additional propagation insights.

SUMMARY

This document concerns systems and methods for operating a system. The methods comprise, by a processor: using a machine learning model to identify which frequency of a plurality of possible frequencies (that can be used by a communication device for wireless communications) is an inferred best frequency based on at least on one of weather report information and predicted weather information (e.g., predicted space weather information); performing operations to select a best frequency from the plurality of possible frequencies using the inferred best frequency and a frequency value selected by a link establishment process (e.g., an ALE process) of the communication device; and causing the communication device to communicate signals with the best frequency which was selected.

In some scenarios, the best frequency is selected based further on subjective information gathered from a user of the communication device or other individuals, sensor data (e.g., measured propagation parameters) and/or estimated propagation parameters.

In those or other scenarios, the best frequency is selected based on a weighted combination of the inferred best frequency and the frequency value. A weight may be selected for each of the inferred best frequency and the frequency value based on a confidence score associated therewith. The weight may have different values at different times. For example, a Look Up Table (LUT) can be accessed to retrieve weights associated with the confidence scores. Alternatively, the weights are set equal to the confidence scores. The present solution is not limited to the particulars of this example. The best frequency may be fed back and used to update the machine learning model. The processor can be internal to or external to the communication device.

The implementing systems can comprise: a processor; and a non-transitory computer-readable storage medium comprising programming instructions that are configured to cause the processor to implement a method for operating a system. The above described methods can also be implemented by a computer program product comprising a memory and programming instructions that are configured to cause a processor to perform operations.

The present document also concerns a communication device. The communication device comprises: a processor; and a non-transitory computer-readable storage medium comprising programming instructions that are configured to cause the processor to implement a method for controlling operations of the communication device. The programming instructions comprise instructions to: obtain an inferred best frequency generated by a machine learning model based on at least on one of weather report information and predicted weather information (e.g., predicted space weather information); select a best frequency from a plurality of frequencies using the inferred best frequency and a frequency value selected by a link establishment process (e.g., an ALE process) of the communication device; and tune the communication device to the best frequency.

In some scenarios, the best frequency is selected based further on subjective information gathered from a user of the communication device or other individuals, sensor data (e.g., measured propagation parameters) and/or estimated propagation parameters.

In those or other scenarios, the best frequency is selected based on a weighted combination of the inferred best frequency and the frequency value. The programming instructions may further comprise instructions to select a weight for each of the inferred best frequency and the frequency value based on a confidence score associated therewith. The weight may have different values at different times. The best frequency may be used to update the machine learning model.

The present document further concerns a non-transitory computer-readable medium having instructions stored thereon that, when executed by at least one computing device, cause the at least one computing device to perform operations comprising: use a machine learning model to identify which frequency of a plurality of possible frequencies that can be used by a communication device for wireless communications is an inferred best frequency based on at least on one of weather report information and predicted weather information; perform operations to select a best frequency from the plurality of possible frequencies using the inferred best frequency and a frequency value selected by a link establishment process of the communication device; and cause a communication device to be tuned to the best frequency.

BRIEF DESCRIPTION OF THE DRAWINGS

This disclosure is facilitated by reference to the following drawing figures, in which like numerals represent like items throughout the figures.

DETAILED DESCRIPTION

Figure 1:
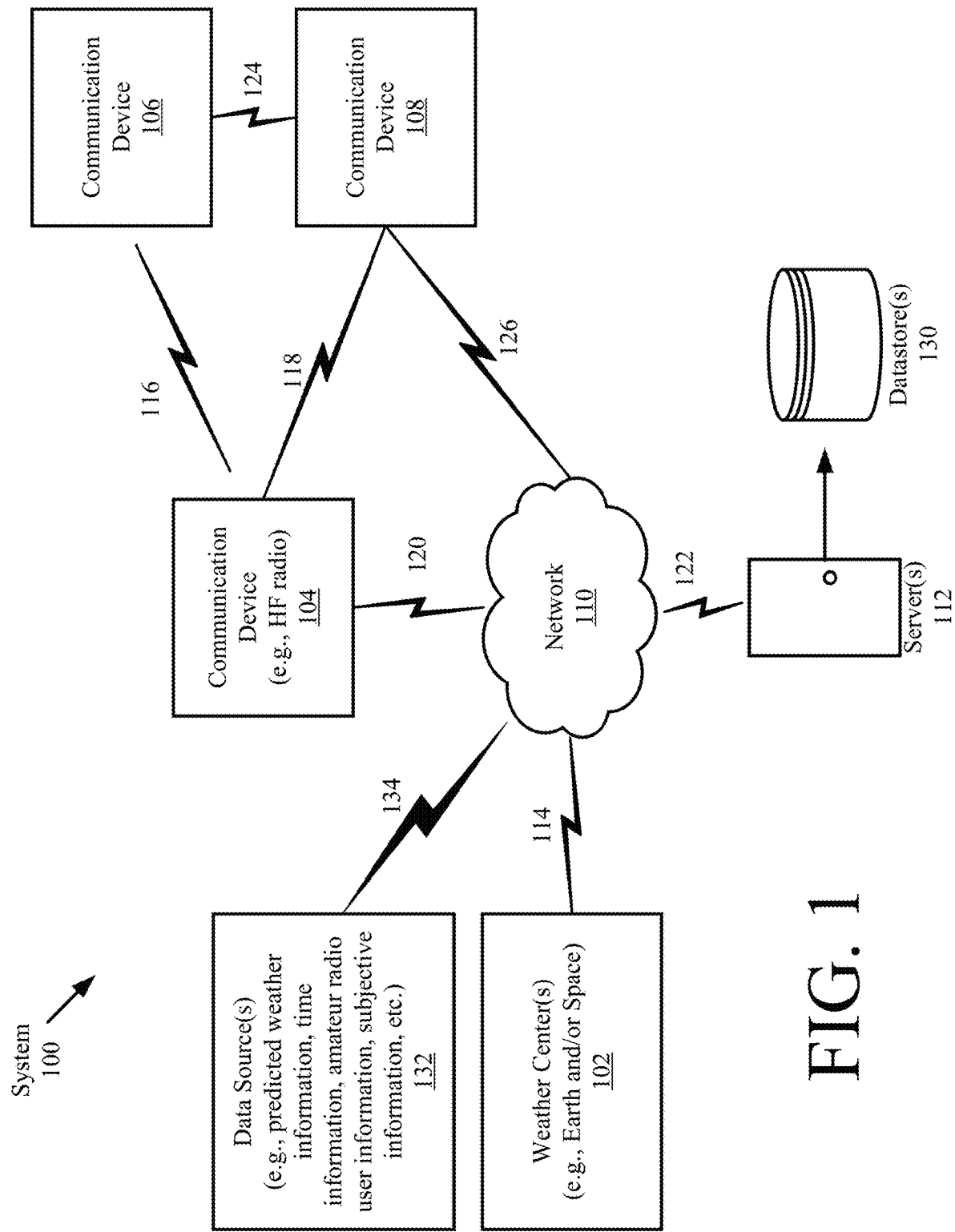
FIG. 1 provides an illustration of a system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Communication systems employing HF radios (such as those described above in the Background section of this paper) suffer from drawbacks. For example, there are relatively few expert users of HF radios at the present time (e.g., amateur radio operators, trained military users). Thus, the HF radios need to be re-designed for use by less skilled individuals. There are times when (i) ALE is either not available or the data has become stale over time and/or (ii) the user is in a stealth mode and does not want to transmit ALE over multiple frequencies. As data rates increase, latency and overhead become issues in HF radio applications. The HF radio needs to be configured to make recommendations for the best frequency for use at any given time in a near real-time manner with minimal impact on throughput and/or in a relatively low Size, Weight, Power and Cost (SWAP-C) manner.

The present solution provides systems and methods for supporting near-real time propagation prediction and frequency management. An Internet based resource can be provided to facilitate future mission planning, radio deployments and/or usage. Machine learning model(s) can be used to facilitate the present solution by providing a relatively fast SWAP-centric propagation aid to communication devices (e.g., HF radios). The machine learning model(s) can include, but is(are) not limited to, deep learning models such as Convolutional Neural Network (CNN) models.

The machine learning model(s) can be trained to infer a best frequency based on various information (e.g., weather report information, predicted weather information, user inputs, etc.). The training data can include, but is not limited to, standard propagation predictions from a propagation prediction program (e.g., VOACAP); outputs from machine learning algorithms using globally received propagation assessment signals (e.g., Weak Signal Propagation Reporter (WSPR)-like signals); observed data parameters for solar flux, planetary K, planetary A, space weather and/or geomagnetic alerts from a weather center (e.g., National Oceanic and Atmospheric Administration (NOAA) Space Weather Prediction Center (SWPC)); and/or other sources (e.g., solar flares, customer test data, internal test data, etc.). Parameters of the machine learning model(s) can be set on the communication devices prior to deployment and/or updated after deployment via over the air transmission(s). The output of the machine learning model(s) is referred to herein as inferred best frequency(ies). The output(s) is(are) then provided to another component of the system.

At this component, operations are performed to determine the best frequency to use at a past, present and/or future time based on a weighted combination of inputs. The inputs include, but are not limited to, the inferred best frequency(ies) output from the trained machine learning model(s), user inputs, subjective data (e.g., what frequency the user or other individual(s) believe is a good frequency to use at a given time), locally generated propagation measurement information (e.g., ALE measurements by an HF radio), remotely generated propagation measurement information (e.g., ALE measurements by a fielded system external to the HF radio), and/or estimated propagation parameters (e.g., daily estimations from voice propagation reports such as WWV radio station reports).

The present solution will be described below in relation to HF radios. The present solution is not limited in this regard and can be employed in other non-HF radio applications.

Referring now to FIG. 1, there is provided an illustration of an illustrative system 100 implementing the present solution. System 100 comprises weather center(s) 102, data source(s) 132, communication devices 104, 106, . . . , 108, a network 110, sever(s) 112 and datastore(s) 130. The weather center(s) 102 include observation post(s) where weather conditions (e.g., Earth and space) and meteorological data are observed and recorded. The weather center(s) 102 can include, but are not limited to, a NOAA SWPC and/or other weather center(s). The recorded weather and/or meteorological data may be communicated from the weather center(s) 102 to the communication device(s) 104-108 and/or server(s) 112 via communication link(s) 114-122 and/or network 110.

The data source(s) 132 can include any source of other information that is relevant for determining a best frequency to use for wireless communications at any given time. Such other information includes, but is not limited to, predicted weather information, time information, amateur radio user information, and/or subjective information (e.g., opinions of individual(s)). The information may be communicated from the data source(s) 132 to the communication device(s) 104-108 and/or server(s) 112 via communication link(s) 134, 116-122, 126 and/or network 110.

Communication link(s) 114, 122, 134 is(are) shown as being wireless communication link(s). In some scenarios, communication link(s) 114, 122, 134 can alternatively or additionally comprise wired communication link(s). Network 110 can include, but is not limited to, the Internet, a radio communications network, and/or a telephony network (e.g., a cellular network).

The communication devices 104-108 are configured to communicate directly with each other via wireless communication links 116, 118, 124 and/or indirectly with each other via network 110 (e.g., using communication links 120, 126). These communications can include, but are not limited to, voice communications, data communications, media communications, talk group communications, and/or Push-to-Talk communications. The communication devices 104-108 can include, but are not limited to, HF radios configured to transmit and receive radio signals with frequencies between 3 MHz and 30 MHz. During operation, a transmitted radio signal propagates through the Earth's atmosphere, bounces or refracts off the ionosphere, and returns to Earth where it is received by receiving communication device(s) that are tuned to the same frequency as that of the transmitting communication device. The manner in which such tuning is achieved will become evident as the discussion progresses.

The communication devices 104-108 are also configured to communicate with remote server(s) 112. The server(s) 112 is(are) provided to facilitate training of machine learning models and/or deployment of the trained machine learning model(s) to the communication devices 104-108. New or updated machine learning models can be deployed daily or at other times. The machine learning model(s) may be trained to facilitate the provision of a relatively fast SWAP-centric propagation aid to the communication devices 104-108. The machine learning model(s) can include, but are not limited to, deep learning models such as CNN models.

The machine learning model(s) can be trained to infer a best frequency based on various information (e.g., weather report information, predicted weather information, user input information, and/or other information). The training data includes, but is not limited to: standard propagation predictions from a propagation prediction program (e.g., VOACAP); outputs from machine learning algorithms using globally received propagation assessment signals (e.g., WSPR signals); observed data parameters for solar flux, planetary K, planetary A, space weather and/or geomagnetic alerts which were recorded by weather center(s) 102; and/or other information from server(s) 112 (e.g., solar flare event information, test data, etc.). Parameters of the machine learning model(s) can be set prior to deployment of the communication devices in the field and/or updated while the communication devices are in the field via over the air transmissions. The output of the machine learning algorithm(s) is(are) referred to herein as inferred best frequency(ies).

The inferred best frequency(ies) is(are) used by the communication device(s) 104-108 to determine the best frequency to use at a past, present and/or future time. Other information may also be used based on a weighted combination of inputs. The inputs include, but are not limited to, the inferred best frequency(ies) output from the trained machine learning model, user inputs, subjective data (e.g., what the user or other individual(s) believe is the good frequency to use at a given time), locally generated propagation measurement information (e.g., ALE measurements by an HF radio), remotely generated propagation measurement information (e.g., ALE measurements by a fielded system external to the HF radio), and/or estimated propagation parameters (e.g., daily estimations from voice propagation reports such as WWV radio station reports). Once a determination is made, the communication device(s) may automatically tune(s) to the best frequency. In some scenarios, the user(s) of the communication device(s) may be prompted to authorize such frequency tuning.

Figure 2:
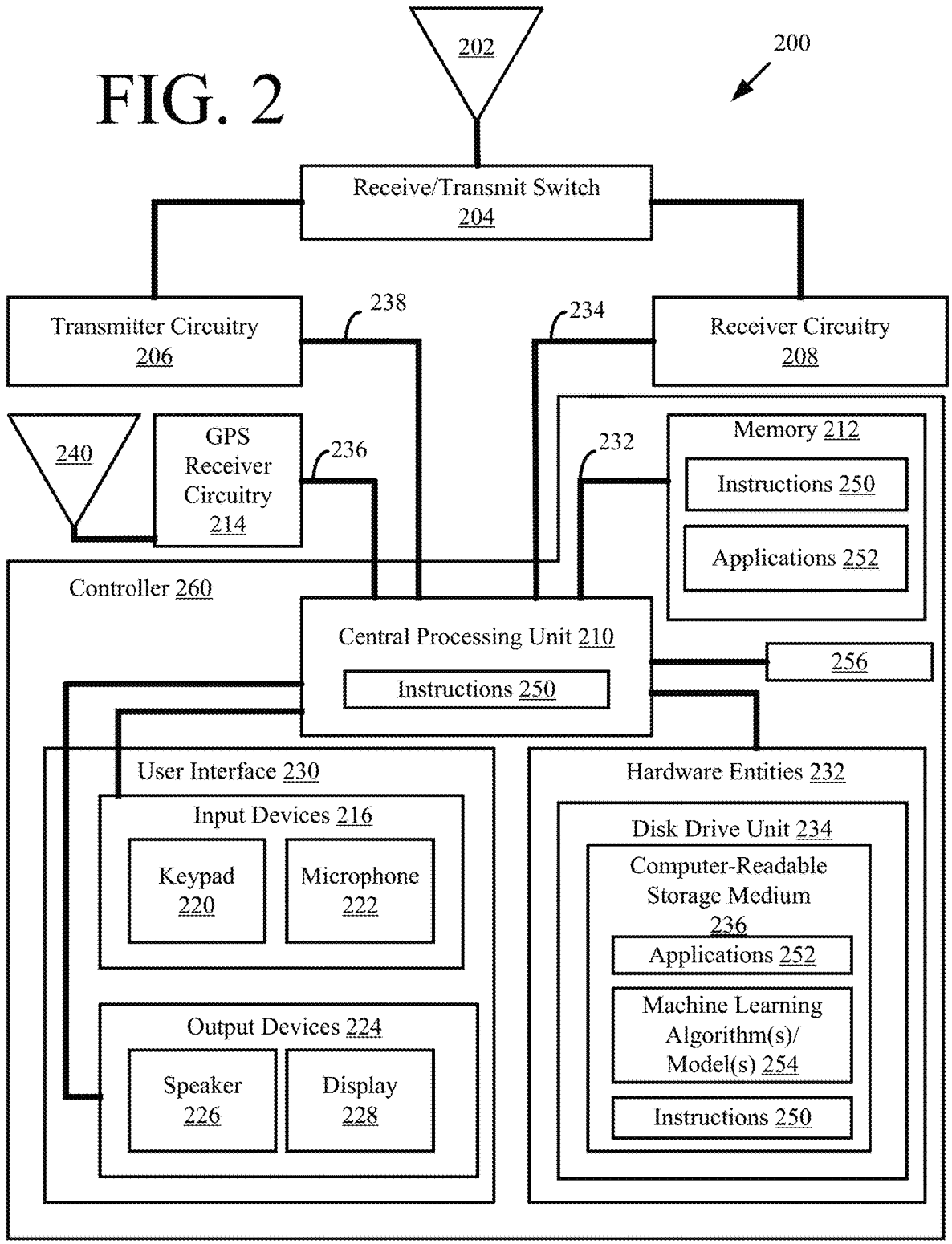
FIG. 2 provides an illustration of a communication device.

Referring now to FIG. 2, there is provided a more detailed block diagram of a communication device 200. The communication devices 104, 106, 108 of FIG. 1 can be the same as or similar to communication device 200. As such, the following discussion of communication device 200 is sufficient for understanding communication devices 104, 106, 108 of FIG. 1. Some or all the components of the communication device 200 can be implemented as hardware, software and/or a combination of hardware and software. The hardware includes, but is not limited to, one or more electronic circuits.

Communication device 200 may include more or less components than those shown in FIG. 2. However, the components shown are sufficient to disclose an illustrative embodiment implementing the present solution. The hardware architecture of FIG. 2 represents one embodiment of a representative device configured to facilitate near-real time propagation prediction and frequency management as described herein. As such, communication device 200 of FIG. 2 implements methods for supporting near-real time propagation prediction and frequency management in accordance with embodiments of the present solution. Such methods are described below in detail.

As shown in FIG. 2, the communication device 200 comprises an antenna 202 for receiving and transmitting communication signals over a wireless communications link. A receive/transmit (Rx/Tx) switch 204 selectively couples the antenna 202 to the transmitter circuitry 206 and receiver circuitry 208 in a manner familiar to those skilled in the art. Although a single antenna 202 and transceiver 204/206/208 is shown in FIG. 2, the present solution is not limited in this regard. Communication device 200 can alternatively comprise a first antenna and a first transceiver for handling a first type of wireless communications (e.g., telephony or satellite communications), as well as a second antenna and a second transceiver for handling a second type of wireless communications (e.g., PTT communications).

The receiver circuitry 208 decodes the communication signals received from an external communication device to derive information therefrom. The receiver circuitry 208 is coupled to a controller 260 via an electrical connection 234. The receiver circuitry 208 provides decoded communication signal information to the controller 260. The controller 260 uses the decoded communication signal information in accordance with the function(s) of the communication device 200. The controller 260 also provides information to the transmitter circuitry 206 for encoding information and/or modulating information into communication signals. Accordingly, the controller 260 is coupled to the transmitter circuitry 206 via an electrical connection 238. The transmitter circuitry 206 communicates the communication signals to the antenna 202 for transmission to an external device.

An antenna 240 is coupled to Global Positioning System (GPS) receiver circuitry 214 for receiving GPS signals. The GPS receiver circuitry 214 demodulates and decodes the GPS signals to extract GPS location information therefrom. The GPS location information indicates the location of the communication device 200. The GPS receiver circuitry 214 provides the decoded GPS location information to the controller 260. As such, the GPS receiver circuitry 214 is coupled to the controller 260 via an electrical connection 236. The present solution is not limited to GPS based methods for determining a location of the communication device 200. Other methods for determining a location of a communication device can be used with the present solution without limitation. The controller 260 uses the decoded GPS location information in accordance with the function(s) of the communication device 200. For example, the GPS location information and/or other location information can be used to generate a geographic map showing the location of the communication device 200 (e.g., relative to other communication devices, buildings and/or landmarks).

The controller 260 stores the decoded signal information and the decoded GPS location information in its internal memory 212. Accordingly, the controller 260 comprises a Central Processing Unit (CPU) 210 that is connected to and able to access the memory 212 through an electrical connection 232. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and/or flash memory. The memory 212 can also have stored therein software applications 252 and/or instructions 250. The software applications 252 include, but are not limited to, applications operative to: facilitate wireless communications with external devices; and/or facilitate the near-real time propagation prediction and frequency management in accordance with the present solution. An illustrative method for supporting near-real time propagation prediction and frequency management is described below in relation to FIGS. 4-8.

At least some of the hardware entities 232 perform actions involving access to and use of memory 212. In this regard, hardware entities 232 may include microprocessors, Application Specific Integrated Circuits (ASICs) and other hardware. Hardware entities 232 may include a microprocessor programmed to: facilitate wireless communications with external devices; and/or facilitate the near-real time propagation prediction and frequency management in accordance with the present solution. In this regard, the microprocessor can access and run applications 252 installed on the communication device 200. The applications 252 can use machine learning algorithm(s) and/or model(s) 254 for various purposes (e.g., to provide a relatively fast SWAP-centric propagation aid to the communication device).

The application(s) 252 may implement Artificial Intelligence (AI) that provides the communications device 200 with the ability to automatically learn and improve data analytics from experience without being explicitly programmed. The application(s) 252 employ(s) one or more machine learning algorithms 254 that learn various information from accessed data (e.g., via pattern recognition and prediction making). Machine learning algorithms are well known in the art. For example, in some scenarios, the machine learning application 254 employs a supervised learning algorithm, an unsupervised learning algorithm, and/or a semi-supervised algorithm. The machine learning algorithm(s) may be used to train the machine learning model(s) and/or to make frequency decisions based on data analysis (e.g., weather report information, predicted weather information, captured sensor information and other information). The data analysis can be achieved using the trained machine learning model(s).

The machine learning model(s) can be trained to infer a best frequency based on various information. The training data includes, but is not limited to: standard propagation predictions from a propagation prediction program (e.g., VOACAP); globally received propagation assessment signals (e.g., WSPR-like signals); observed data parameters for solar flux, planetary K, planetary A, space weather and/or geomagnetic alerts from a weather center (e.g., NOAA SWPC); and/or other sources (e.g., solar flares, customer test data, internal test data, etc.). Parameters of the machine learning model(s) can be set prior to deployment of the communication device 200 in the field and/or updated while in the field via Over-The-Air (OTA) transmission(s). Confidence score(s) is(are) output from the machine learning model along with the inferred best frequency(ies). These confidence score(s) can be used to select weights for the inferred best frequency(ies) as described below.

The output(s) of the machine learning algorithm(s) is(are) then provided to the CPU 210 for use in making a determination as to the best frequency to use at a past, present and/or future time. Other information can also be used to make this determination. This other information includes, but is not limited to, local and distributed ALE measurements by a fielded operating system, and/or daily estimated parameters from voice propagation reports. The inferred best frequency(ies) and other information may be weighted and combined to produce a score. The score may then be compared to threshold values associated with the possible frequencies that can be used by the communication device 200 for wireless communications. One of the frequencies is selected based on the results of the comparisons. The communication device may then be configured to perform wireless communication using the selected frequency. The tuning to the selected frequency can be automatic or in response to a user input.

In some scenarios, the weight for each input value is selected by the communication device 200 based on the associated confidence score and/or other criteria (e.g., type of information). For example, a first confidence score (e.g., 92%) is associated with an ALE measurement at time $t_1$, and a second different confidence score (e.g., 76%) is associated with an ALE measurement at time $t_2$. At time $t_1$, the communication device selects a first weight $w_1$ to be used for generating the score. At time $t_2$, the communication device selects a second different weight $w_2$ to be used for generating the score. The present solution is not limited to the particulars of this example.

In some scenarios, a different range of threshold values is defined for each possible frequency or set of possible frequencies. For example, a first frequency f1 (e.g., 14 MHz) is selected when the score s is greater than a first threshold thr1 and less than a second threshold thr2 (i.e., thr1<s<thr2). A second different frequency f2 (e.g., 10 MHz) is selected when the score s is greater than a third threshold thr3 and less than the first threshold thr1 (i.e., thr3<s<thr1). The present solution is not limited to the particulars of this scenario. Other techniques can be used to select the best frequency.

The hardware entities 232 can include a disk drive unit 234 comprising a computer-readable storage medium 236 on which is stored one or more sets of instructions 250 (e.g., software code) configured to implement one or more of the methodologies, procedures, or functions described herein. The instructions 250 can also reside, completely or at least partially, within the memory 212 and/or within the CPU 210 during execution thereof by the computing device 200. The memory 212 and the CPU 210 also can constitute machine-readable media. The term "machine-readable media", as used here, refers to a single medium or multiple media (e.g., a centralized or distributed database, and/or associated caches and servers) that store the one or more sets of instructions 250. The term "machine-readable media", as used here, also refers to any medium that is capable of storing, encoding or carrying a set of instructions 250 for execution by the computing device 200 and that cause the computing device 200 to perform any one or more of the methodologies of the present disclosure.

The user interface 230 comprises input devices 216 and output devices 224. The input devices 216 include, but are not limited to, a keypad 220, a microphone 222, and buttons (not shown). The buttons can enable a user-software interaction to initiate a wireless communication, for example, using the frequency which was determined by the CPU 210 to be the best frequency for use at a given time.

The output devices 224 include, but are not limited to, a speaker 226 and a display 228. During operation, one or more GUIs may be presented to the user of the communication device 200 via the display 228. For example, a GUI may be displayed on display 228 for enabling a user-software interaction to initiate a wireless communication, for example, using the frequency which was determined by the CPU 210 to be the best frequency for use at a given time.

Figure 3:
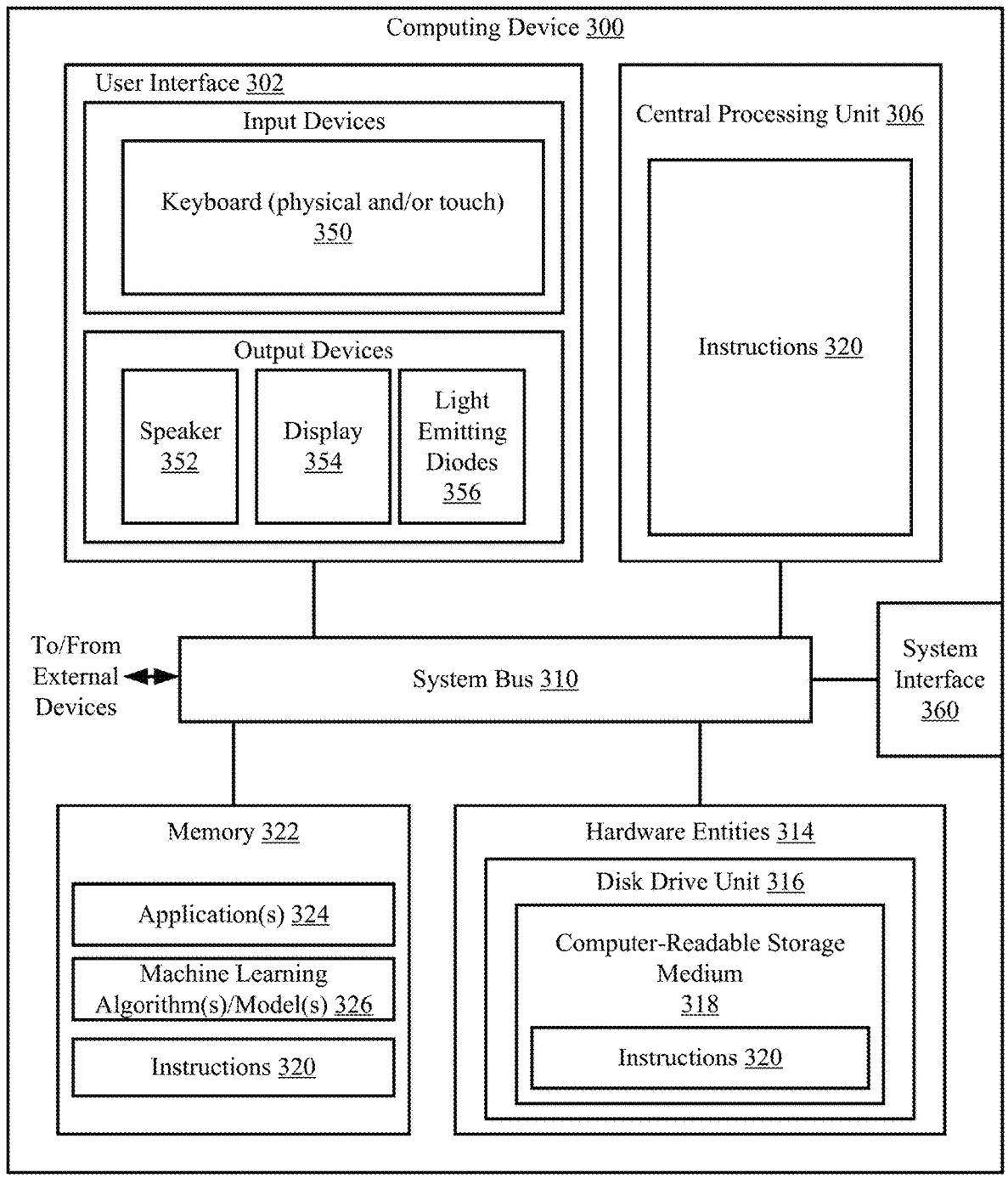
FIG. 3 provide an illustration of a computing device.

Referring now to FIG. 3, there is shown a hardware block diagram comprising an illustrative computing device 300. Server 112 of FIG. 1 can be the same as or substantially similar to computing device 300. As such, the discussion of computing device 300 is sufficient for understanding server 112 of FIG. 1.

Computing device 300 may include more or less components than those shown in FIG. 3. However, the components shown are sufficient to disclose an illustrative solution implementing the present invention. The hardware architecture of FIG. 3 represents one implementation of a representative computing device configured to enable support of near-real time propagation prediction and frequency management as described herein. As such, the computing device 300 of FIG. 3 implements at least a portion of the method(s) described herein.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a CPU 306, a system bus 310, a memory 322 connected to and accessible by other portions of computing device 300 through system bus 310, and hardware entities 314 connected to system bus 310. The user interface can include input devices (e.g., a keypad 350) and output devices (e.g., a speaker 352, a display 354, and/or light emitting diodes 356), which facilitate user-software interactions for controlling operations of the computing device 300.

At least some of the hardware entities 314 perform actions involving access to and use of memory 322, which can be a RAM, a disk driver and/or a CD-ROM. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 322 and/or within the CPU 306 during execution thereof by the computing device 300. The memory 322 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating near-real time propagation prediction and frequency management. In this regard, it should be understood that the electronic circuit can access and run application(s) 324 and/or a machine learning application(s) 326 installed on the computing device 300.

The machine learning application(s) 326 may implement AI that provides the computing device 300 with the ability to automatically learn and improve data analytics from experience without being explicitly programmed. The machine learning application(s) employ(s) one or more machine learning algorithms that learn various information from accessed data (e.g., via pattern recognition and prediction making). Machine learning algorithms are well known in the art. For example, in some scenarios, the machine learning application 326 employs a supervised learning algorithm, an unsupervised learning algorithm, and/or a semi-supervised algorithm. The learning algorithm(s) is(are) used to model frequency decisions based on data analysis (e.g., captured sensor information and other information).

Figure 4:
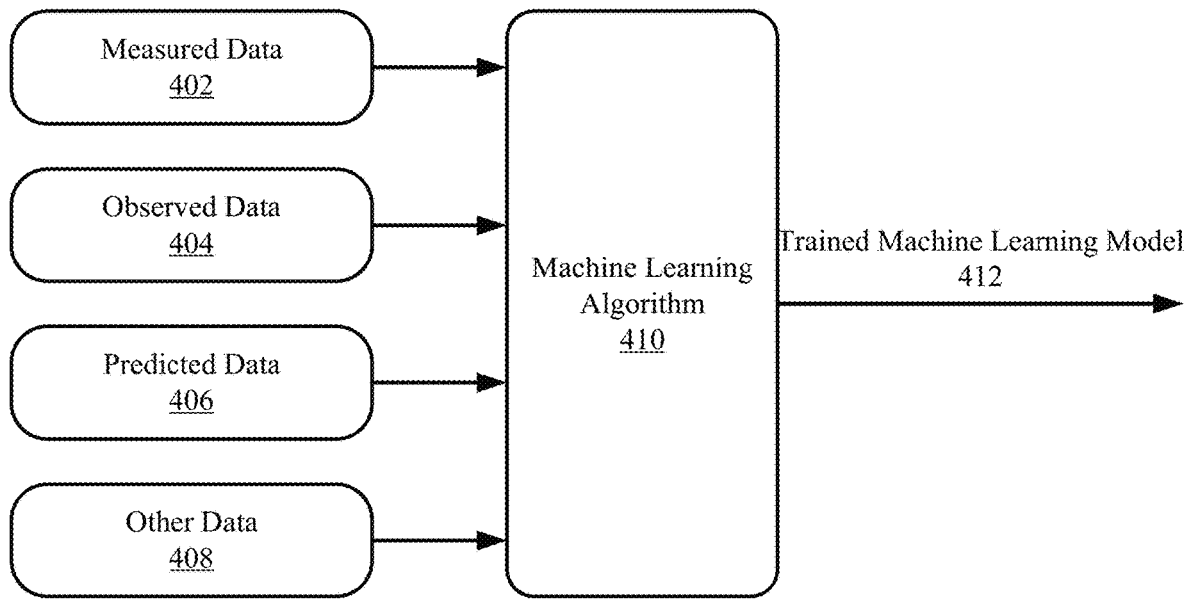
FIG. 4 provides an illustration that is useful for understanding how a machine learning model is trained in accordance with the present solution.

Referring now to FIG. 4, there is provided an illustration that is useful for understanding how a machine learning model is trained in accordance with the present solution. The machine learning model is trained by providing a machine learning algorithm 410 with training data to learn from. The machine learning algorithm 410 finds pattern(s) in the training data that map input data attributes to predicted best frequency(ies). The output of the machine learning algorithm 410 is a machine learning model 412 that is trained to infer best frequency(ies) based on the pattern(s).

The training data can include, but is not limited to, measured data 402, observed data 404, predicted data 406 and/or other data 408. The measured data 402 can include, but is not limited to, contents of reception reports from probing potential propagation paths (e.g., on HF bands) with low-power transmissions (e.g., via WSPR beacon(s) 256 of FIG. 2) and/or other sensor data (e.g., by sensor(s) 256 of FIG. 2). The observed data 404 can include, but is not limited to, solar flux, planetary K information specifying fluctuations in the geomagnetic field at specific geographic location(s), a planetary A value representing an average amount of fluctuation in the geomagnetic field at specific geographic location(s) throughout a given day, space weather and/or contents of geomagnetic alerts from NOAA SWPC. The predicted data 406 can include, but is not limited to, propagation predictions made using a radio propagation model (e.g., a VOACAP model that used empirical data to predict point-to-point path loss and coverage of a transceiver given two antennas, solar weather and/or time/date). The other data 408 can include, but is not limited to, solar flare event data, solar flare predictions, and/or test data.

Figure 5:
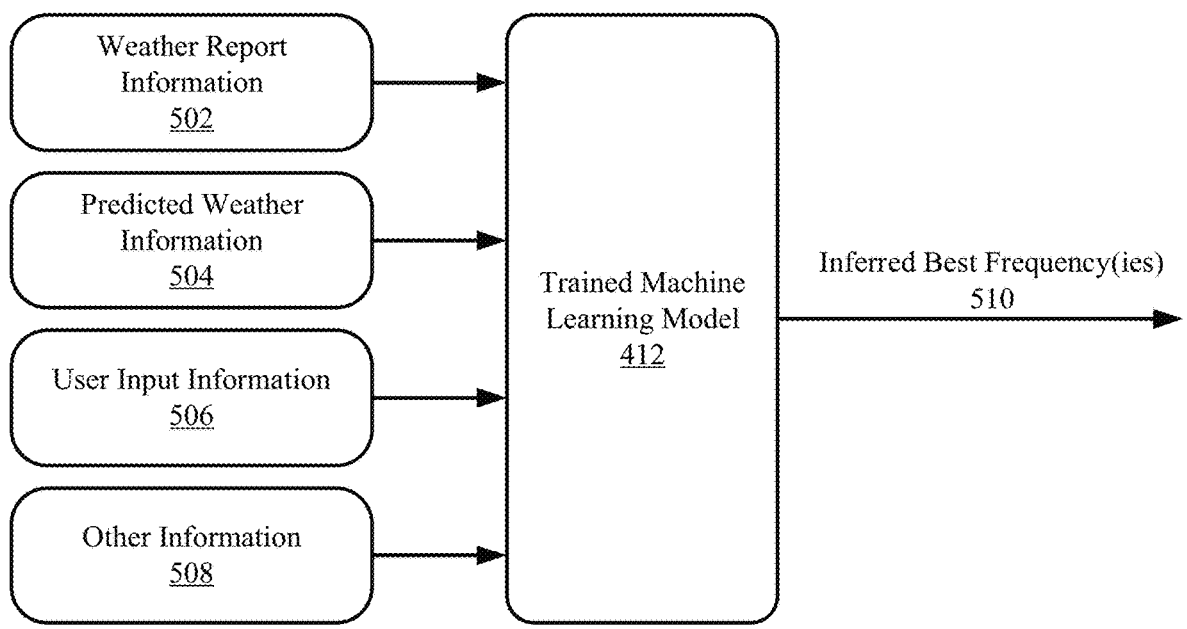
FIG. 5 provides an illustration that is useful for understanding how a trained machine learning model operates.

Referring now to FIG. 5, there is provided an illustration that is useful for understanding how inferred best frequency(ies) is(are) output using the trained machine learning model 412 of FIG. 4. The machine learning model is trained to recognize patterns in various types of information 502-508. The machine learning model can include, but is not limited to, a CNN model. The information input into the machine learning model can include, but is not limited to, weather report information 502 (e.g., broadcast media report information issued on the Internet, daily estimations from voice propagation reports such as WWV radio station reports and/or NOAA radio station live reports), predicted weather information 504 (e.g., NOAA weather predictions), user input information 506 (e.g., actual weather conditions, opinions with regard to which frequency should be used, etc.) and/or other information 508 (e.g., preloaded default frequency values). Once a pattern is detected in the information 502-508, the machine learning model selects the frequency which is associated with the pattern. The machine learning model may also obtain or compute a confidence score for the selected frequency. Techniques for computing confidence scores by machine learning models are well known.

Figure 6:
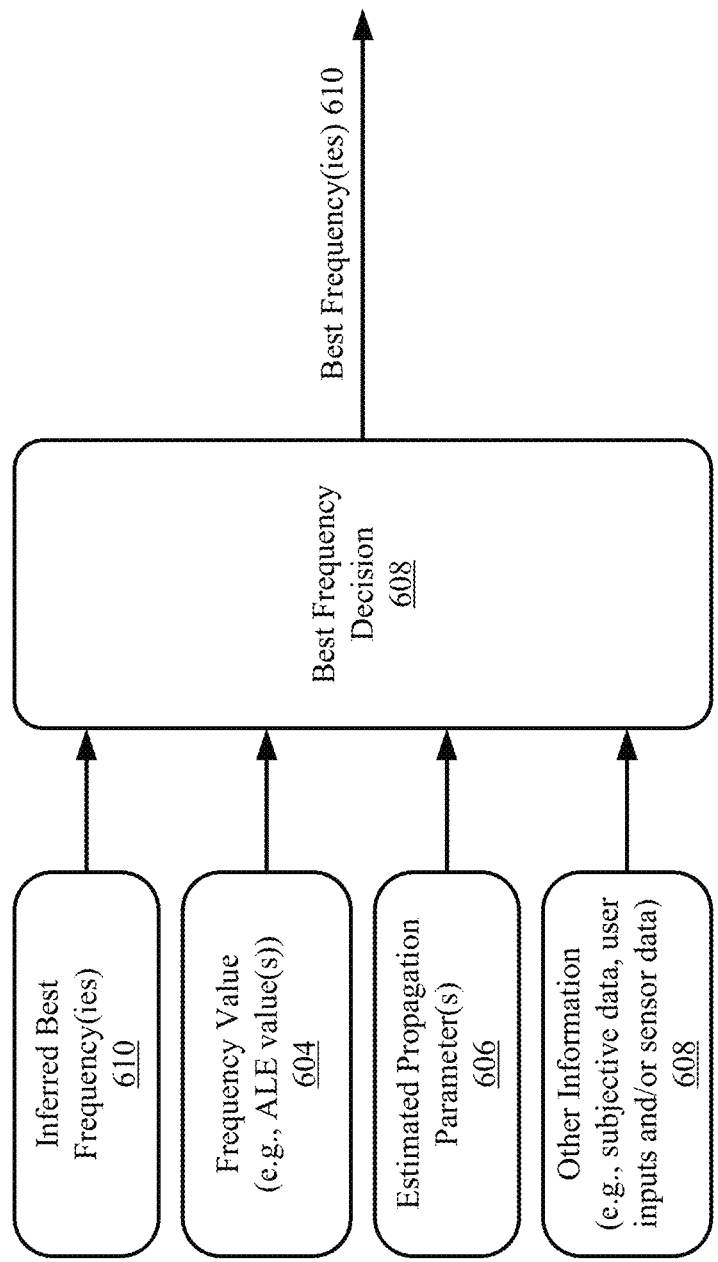
FIG. 6 provides an illustration that is useful for understanding how a best frequency is identified and/or selected using an inferred best frequency output from a trained machine learning model and other information.

Referring now to FIG. 6, there is provided an illustration that is useful for understanding how a best frequency is identified and/or selected in accordance with the present solution. The best frequency is identified/selected in block 608 using various information. This information includes, but is not limited to, the inferred best frequency(ies) output from the trained machine learning algorithm, a frequency value selected by a link establishment process (e.g., ALE value), estimated propagation parameter(s) (e.g., daily estimations from voice propagation reports such as WWV radio station reports), and/or other information (e.g., user inputs, subjective data reflecting the opinions of individual(s) relating to which frequency should be used at a given time, and/or sensor data (e.g., generated by sensors of the communication device or external device)). The sensor data can include, but is not limited to, measured propagation parameters and/or weather conditions (e.g., Earth and/or space).

In block 608, weights are selected for each input 604-610 based on confidence scores associated therewith and/or other criteria (e.g., type of information). For example, a first weight w1 is selected for the inferred best frequency based on its associated confidence score, while a second weight w2 is selected for radio measurement information 604 (e.g., an ALE value) based on its associated confidence score, a third weight w3 is selected for an estimated propagation parameter (e.g., a WWV radio station report parameter value) based on its associated confidence score and/or the type of parameter (e.g., solar radiation storm level, planetary k index, geomagnetic storm level, etc.), and/or a fourth weight w4 is selected for the other information based on its confidence score and/or the type of information (e.g., user input or individual's opinion). Accordingly, the score can be defined in accordance with the following mathematical equation (1).

$$s=(w1 \cdot I)+(w2 \cdot M)+(w3 \cdot E)+(w4 \cdot O) \quad (1)$$

where s represents the score, I represents an inferred best frequency output from a trained machine learning model, M represents a radio measurement, E represents an estimated propagation parameter, and O represents other information. The present solution is not limited to the manner in which the score is computed in this example. Other algorithms can be employed to compute the score.

Figure 7:
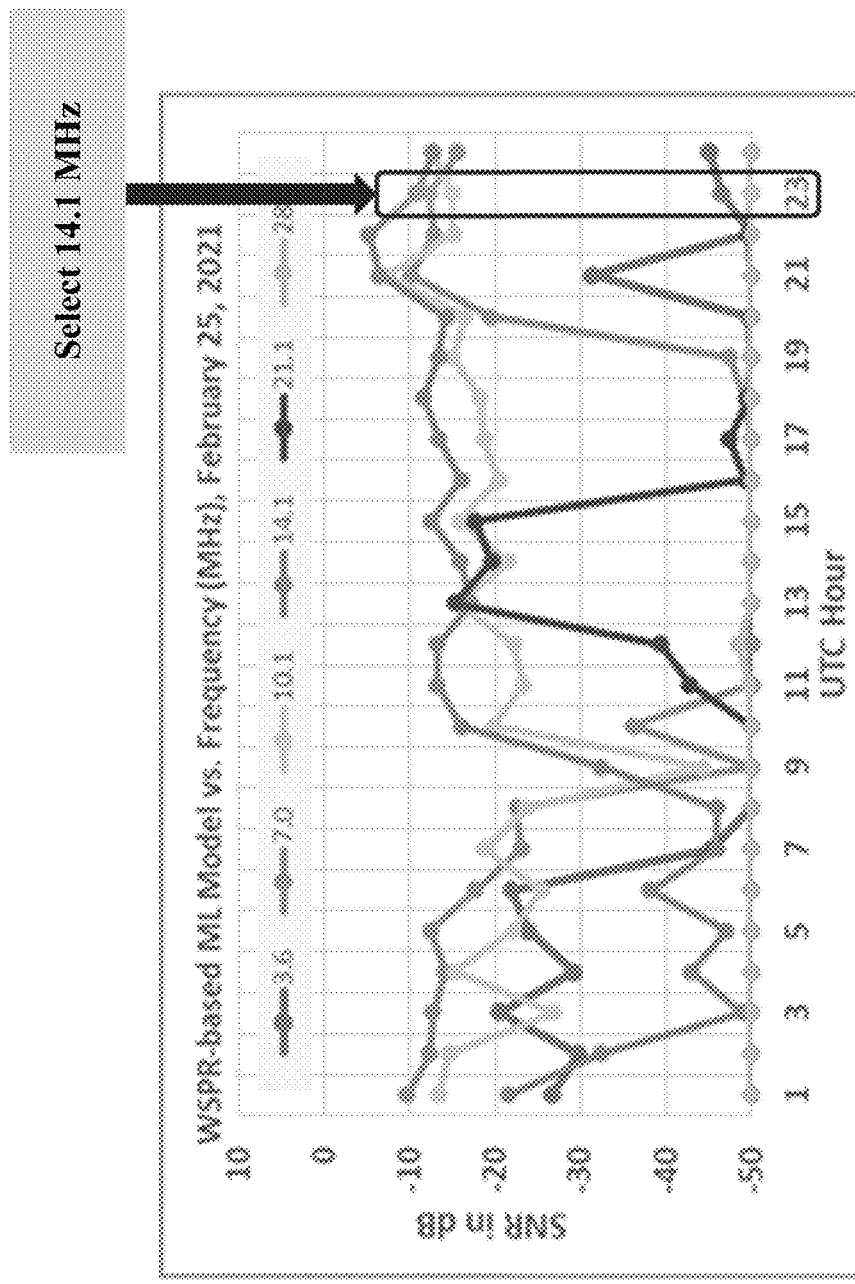
FIG. 7 provides a graph that plots Signal-to-Noise Ratio (SNR) values for a plurality of different frequencies over time.

Once the score s is computed, the score may be compared to one or more threshold values. For example, with reference to FIG. 7, a communication device is configured to communicate using frequencies 3.6 MHz, 7.0 MHz, 10.1 MHz, 14.1 MHz, 21.1 MHz and 28.0 MHz. A frequency of 3.6 MHz is selected as the best frequency when the score s is less than a first threshold thr1. A frequency of 7.0 MHz is selected as the best frequency when the score s is greater than the first threshold thr1 and less than a second threshold thr2. A frequency of 10.1 MHz is selected as the best frequency when the score s is greater than the second threshold thr2 and less than a third threshold thr3, and so on. A frequency of 28.0 MHz is selected as the best frequency when the score s is greater than an $N^{th}$ threshold thrN. As shown in FIG. 7, the system selects 14.1 MHz for use at 23:00 UTC. The present solution is not limited to the particulars of this example.

Other algorithms can be used to select the best frequency 610. For example, the best frequency is selected based on ALE information shown in the following Table 1 and machine learning information shown in the following Table 2.

TABLE 1

| Frequency (MHz) | Estimated SNR (dB) | Confidence Level (0 to 6) |
|---|---|---|
| 3.6 | −50 | 5 |
| 7.0 | −15 | 5 |
| 10.1 | −20 | 5 |
| 14.1 | −9 | 5.5 |
| 21.1 | −50 | 4 |
| 28 | −50 | 3 |

The ALE process result suggests that 14.1 MHz should be used because it is associate with the highest estimated SNR.

TABLE 2

| Frequency (MHz) | Estimated SNR (dB) | Confidence Level (0 to 3) |
|---|---|---|
| 3.6 | −45 | 3 |
| 7.0 | −12 | 3 |
| 10.1 | −14 | 3 |
| 14.1 | −10 | 3 |
| 21.1 | −49 | 2.9 |
| 28 | −50 | 2.8 |

The machine learning model result suggests that 14.1 MHz should be used because it is associate with the highest estimated SNR. The best frequency is selected using the information in Table 1, Table 2 as shown by the following mathematical equations (2)-(4).

$$SNR=(SNR_{ALE} \text{ conf}_1)+(SNR_{ML} \text{ conf}_2) \quad (2)$$

$$\text{conf}_1=\text{conf}_{ALE}/(\text{conf}_{ALE}+\text{conf}_{ML}) \quad (3)$$

$$\text{conf}_2=\text{conf}_{ML}/(\text{conf}_{ALE}+\text{conf}_{ML}) \quad (4)$$

where $SNR_{ALE}$ represents an SNR estimate generated by an ALE process, $SNR_{ML}$ represents an SNR estimate generated by a machine learning model, $conf_{ALE}$ represents a confidence level associated with $SNR_{ALE}$, and $conf_{ML}$ represents a confidence level associated with $SNR_{ML}$. The results from computations using the above mathematical equations (2)-(4) are presented in the following Table 3.

TABLE 3

| Frequency (MHz) | Estimated SNR (dB) |
|---|---|
| 3.6 | −48.125 |
| 7.0 | −13.875 |
| 10.1 | −17.75 |
| 14.1 | −9.35 |
| 21.1 | −49.58 |
| 28 | −49.95 |

Since 14.1 MHz is associated with the highest SNR, the system selects this frequency as the best frequency. The present solution is not limited to the particulars of this technique for selecting the best frequency.

In other scenarios, other information may be considered in additional to the ALE values of Table 1 and machine learning values of Table 2. The other information can include, but is not limited to, an opinion of an operator. Mathematical equations (2)-(4) can be modified as shown below to account for the other information.

$$SNR = (SNR_{ALE}\, conf_1) + (SNR_{ML}\, conf_2) + (SNR_{other}\, conf_3) \quad (5)$$

$$conf_3 = conf_{other}/(conf_{ALE} + conf_{other}) \quad (6)$$

where $SNR_{other}$ represents an SNR estimate input into the system by the operator, and $conf_{other}$ represents a confidence level associated with $SNR_{other}$. The present solution is not limited to the particulars of this example.

Figure 8:
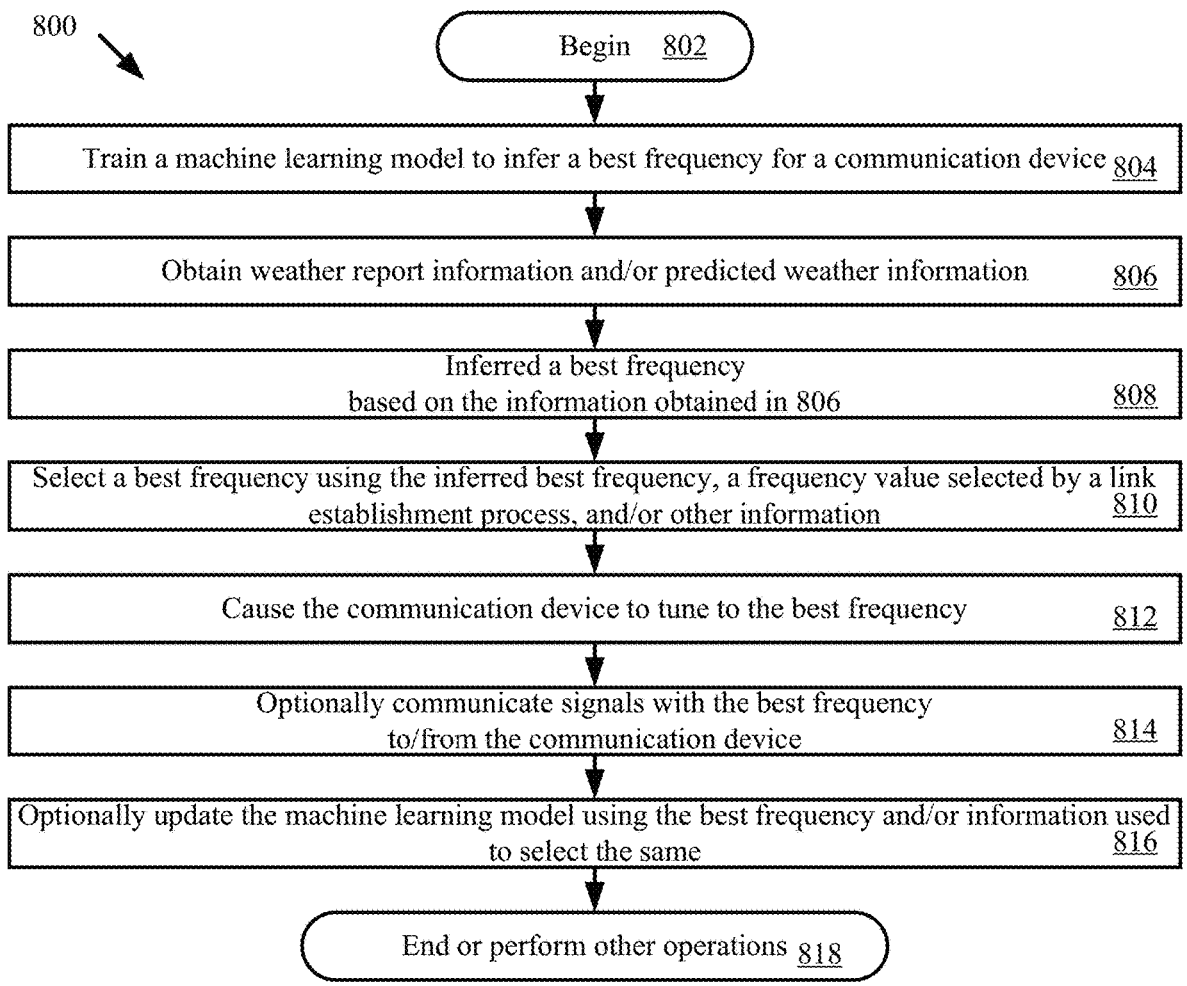
FIG. 8 provides a flow diagram of an illustrative method for operating a system such as that shown in FIG. 1.

Referring now to FIG. 8, there is provided a flow diagram of an illustrative method 800 for operating a system (e.g., system 100 of FIG. 1). Method 800 begins with 802 and continues with 804 where a machine learning model (e.g., machine learning mode 254 of FIGS. 2 and/or 326 of FIG. 3) is trained to infer a best frequency for a communication device (e.g., communication device 104, 106 or 108 of FIGS. 1 and/or 200 of FIG. 2). This training can be performed at a computing device (e.g., server(s) 112 of FIG. 1 and/or computing device 300 of FIG. 3) remote from the communication device. In some scenarios, the trained machine learning model is deployed to the communication device.

In 806, the communication device obtains weather report information and/or predicted weather information. The weather report information can include, but is not limited to, WWV OTA reports. The predicted weather information can include, but is not limited to, NOAA predicted weather conditions for Earth and/or space. Other information may also be optionally obtained in 806. This other information includes, but is not limited to, user input information (e.g., actual weather conditions, opinions as to which frequency should be used, etc.) and/or preloaded default frequency values.

In 808, the machine learning model (e.g., machine learning mode 254 of FIGS. 2 and/or 326 of FIG. 3) is used to identify which frequency of a plurality of possible frequencies (e.g., frequencies 3.6 MHz, 7.0 MHz, 10.1 MHz, 14.1 MHz, 21.1 MHz and/or 28.0 MHz of FIG. 7) that can be used by a communication device (e.g., communication device 104, 106 or 108 of FIGS. 1 and/or 200 of FIG. 2) for wireless communications is an inferred best frequency based on the information obtained in 806. The operations of 808 can be performed by the communication device or a computing device external to the communication device (e.g., by a server of a cloud service provider).

In 810, a best frequency is selected using the inferred best frequency output from the trained machine learning model, a frequency value selected by a link establishment process (e.g., an ALE process) of the communication device, and/or other information (e.g., subjective information gathered from a user of the communication device or other individuals, sensor data and/or estimated propagation parameters).

In those or other scenarios, the best frequency is selected based on a weighted combination of the inferred best frequency, the frequency value and/or other information. A weight may be selected for each of the inferred best frequency, the frequency value and/or other information based on a confidence score associated therewith. The weight may have different values at different times.

In 812, the communication device is then caused to tune to the best frequency. The communication device may then optionally communicate signals with the best frequency, as shown by 814. The best frequency and/or information used to select the same may be feedback and used to update the machine learning model as shown by 816. Subsequently, 818 is performed where method 800 ends or other operations are performed (e.g., return to 806).

The implementing systems of method 800 can comprise: a processor; and a non-transitory computer-readable storage medium comprising programming instructions that are configured to cause the processor to implement a method for operating a system. The above described methods can also be implemented by a computer program product comprising a memory and programming instructions that are configured to cause a processor to perform operations.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for operating a system, comprising:
 using, by a processor, a machine learning model to identify which frequency of a plurality of possible frequencies that can be used by a communication device for wireless communications is an inferred best frequency based on at least one of weather report information and predicted weather information;
 selecting a weight for each of the inferred best frequency and a frequency value based on a confidence score associated therewith, the frequency value selected by a link establishment process of the communication device;

performing, by the processor, operations to select a best frequency from the plurality of possible frequencies based on a weighted combination of the inferred best frequency and the frequency value using the selected weights; and causing, by the processor, the communication device to communicate signals with the best frequency which was selected;

wherein the weight has different values at different times.

2. The method according to claim 1, wherein the predicted weather information includes predicted space weather information.

3. The method according to claim 1, wherein the best frequency is selected by the processor based further on subjective information gathered from a user of the communication device or other individuals.

4. The method according to claim 1, wherein the best frequency is selected by the processor based further on at least one of sensor data and estimated propagation parameters.

5. The method according to claim 1, wherein the link establishment process comprises an automatic link establishment process.

6. The method according to claim 1, wherein the best frequency is used to update the machine learning model.

7. The method according to claim 1, wherein the processor is internal to or external to the communication device.

8. A communication device, comprising:

a processor; and a non-transitory computer-readable storage medium comprising programming instructions that are configured to cause the processor to implement a method for controlling operations of the communication device, wherein the programming instructions comprise instructions to:

obtain an inferred best frequency generated by a machine learning model based on at least on one of weather report information and predicted weather information;

select a weight for each of the inferred best frequency and a frequency value based on a confidence score associated therewith, the frequency value selected by a link establishment process of the communication device;

select a best frequency from a plurality of frequencies based on a weighted combination of the inferred best frequency and the frequency value using the weights selected; and tune the communication device to the best frequency;

wherein the weight has different values at different times.

9. The communication device according to claim 8, wherein the predicted weather information includes predicted space weather information.

10. The communication device according to claim 8, wherein the best frequency is selected based further on subjective information gathered from a user of the communication device or other individuals.

11. The communication device according to claim 8, wherein the best frequency is selected based further on at least one of sensor data and estimated propagation parameters.

12. The communication device according to claim 8, wherein the link establishment process comprises an automatic link establishment process.

13. The communication device according to claim 1, wherein the best frequency is used to update the machine learning model.

14. A non-transitory computer-readable medium having instructions stored thereon that, when executed by at least one computing device, cause the at least one computing device to perform operations comprising:

use a machine learning model to identify which frequency of a plurality of possible frequencies that can be used by a communication device for wireless communications is an inferred best frequency based on at least on one of weather report information and predicted weather information;

select a weight for each of the inferred best frequency and a frequency value based on a confidence score associated therewith, the frequency value selected by a link establishment process of the communication device;

perform operations to select a best frequency from the plurality of possible frequencies based on a weighted combination of the inferred best frequency and the frequency value based on the weights selected; and cause a communication device to be tuned to the best frequency;

wherein the weight has different values at different times.

* * * * *